US008966118B2

(12) United States Patent
Voronel et al.

(10) Patent No.: US 8,966,118 B2
(45) Date of Patent: Feb. 24, 2015

(54) UNAUTHENTICATED REDIRECTION REQUESTS WITH PROTECTION

(75) Inventors: Gary Voronel, Seattle, WA (US); Daron Spektor, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 221 days.

(21) Appl. No.: 13/296,184

(22) Filed: Nov. 14, 2011

(65) Prior Publication Data

US 2013/0124756 A1     May 16, 2013

(51) Int. Cl.
    *H04L 29/06*     (2006.01)
    *H04L 29/08*     (2006.01)

(52) U.S. Cl.
    CPC .......... *H04L 63/126* (2013.01); *H04L 63/1483* (2013.01); *H04L 67/02* (2013.01)
    USPC ........................................................ 709/239

(58) Field of Classification Search
    CPC .................................................. H04L 67/2814
    See application file for complete search history.

(56) References Cited

U.S. PATENT DOCUMENTS

| 6,981,210 | B2 | 12/2005 | Peters et al. |
| 7,530,099 | B2 | 5/2009 | Flurry et al. |
| 7,774,459 | B2 | 8/2010 | Wang et al. |
| 7,840,888 | B2 | 11/2010 | Lin |
| 2002/0046299 | A1 | 4/2002 | Lefeber et al. |
| 2002/0083178 | A1* | 6/2002 | Brothers ........................ 709/226 |
| 2003/0061378 | A1 | 3/2003 | Mazzitelli |
| 2006/0174019 | A1 | 8/2006 | Ikudome et al. |
| 2011/0090906 | A1* | 4/2011 | Arkko ........................ 370/392 |

OTHER PUBLICATIONS

Chellapilla, K., et al., "A Taxonomy of JavaScript Redirection Spam", Retrieved Jul. 8, 2011 at <<http://www2007.org/workshops/paper_115.pdf>>, Proceedings of the 3rd International Workshop on Adversarial Information Retrieval on the Web (2007), pp. 81-88.

* cited by examiner

*Primary Examiner* — Huy D Vu
*Assistant Examiner* — Bao G Nguyen
(74) *Attorney, Agent, or Firm* — Steven Spellman; Jim Ross; Micky Minhas (57) ABSTRACT

A redirection object may be obtained, based on a current request of a current requestor. The redirection object request may be associated with a response to a previous request for a redirection to a destination network location, the previous request associated with a previous requestor. A current transmission origination location associated with a current requestor transmission of the current request may be determined. It may be determined whether the current transmission origination location includes a similarity to a previous transmission origination location associated with a previous transmission of the previous request, based on identification information included in the redirection object. It may be determined whether to initiate a redirect operation of the current requestor to the destination network location, based on a result of the determining of the similarity between the current transmission origination location and the previous transmission origination location.

20 Claims, 9 Drawing Sheets

UNAUTHENTICATED REDIRECTION REQUESTS WITH PROTECTION

BACKGROUND

Users of electronic devices are increasingly relying on information obtained from the Internet as sources of news reports, ratings, descriptions of items, announcements, event information, and other various types of information that may be of interest to the users. Further, users are increasingly relying on web sites to shop for products and services online. The websites users visit may redirect users to other websites for various reasons. For example, a mobile device application may not provide support for a particular web site rendering technique (e.g., MICROSOFT SILVERLIGHT technology), and the application may thus wish to have some web sites rendered by another application instead. Thus, a first application may provide to a second application the Uniform Resource Locator (URL) of a website so that it may be rendered. Web-browsing sessions may maintain state about a user via technology such as browser cookies, which are isolated to a single application. In order for the user's browsing session in the first application to continue in the second, some browser cookies may be transferred to the second application. To accomplish this, the first application may provide the second application with a URL to a website that issues the appropriate cookies and then redirects to the original URL. To facilitate this, a website may expose a service whereby an application may request such a redirect URL. However, phishing users may use redirect URLs to redirect other users to web sites that may not be desired by the other users.

SUMMARY

According to one general aspect, a system may include a redirect request receiving component that obtains a first request from a first originating requestor for a redirection Uniform Resource Locator (URL). The system may also include a first originating location determination component that determines a first originating Internet Protocol (IP) address associated with an originating transmission of the first request. The system may also include a redirection object generator that generates, via a device processor, a first redirection object that includes a retransmission location indicator and first information associated with identification of the first originating IP address. The system may also include a redirection object receiving component that obtains the first redirection object transmitted from a second originating requestor. The system may also include a second originating location determination component that determines a second originating IP address associated with an originating transmission of the first redirection object from the second originating requestor. The system may also include a similarity determination component that determines an originating transmission location similarity between the first originating IP address and the second originating IP address. The system may also include a redirect decision component that determines whether to initiate a redirection associated with the first redirection object, based on the determined originating transmission location similarity.

According to another aspect, a redirection object may be obtained, based on a current request of a current requestor. The redirection object may be associated with a response to a previous request for a redirection to a destination network location, the previous request associated with a previous requestor. A current transmission origination location associated with a current requestor transmission of the current request may be determined. It may be determined whether the current transmission origination location includes a similarity to a previous transmission origination location associated with a previous transmission of the previous request, based on identification information included in the redirection object. It may be determined whether to initiate a redirect operation of the current requestor to the destination network location, based on a result of the determining of the similarity between the current transmission origination location and the previous transmission origination location.

According to another aspect, a computer program product tangibly embodied on a computer-readable storage medium may include executable code that may cause at least one data processing apparatus to receive, based on a current request, a redirection object, the redirection object associated with a response to a previous request for a redirection to a destination network location. Further, the at least one data processing apparatus may determine a current transmission origination location associated with the current request. Further, the at least one data processing apparatus may determine whether the current transmission origination location includes a similarity to a previous transmission origination location associated with a previous transmission of the previous request, based on identification information included in the redirection object. Further, the at least one data processing apparatus may determine whether to initiate a redirect operation, based on a result of the determining of the similarity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DETAILED DESCRIPTION

Application developers may desire redirect Uniform Resource Locators (URLs) to be generated on a server at run-time. While this may be accomplished by authenticating a client associated with a user, an authentication may involve submission of a secret known by the client and the server. For many applications, this may not be feasible because of the deployment model of the application. However, use of an unauthenticated service to generate redirect URLs may expose the service to phishing attacks, as a phishing user may create URLs such as "www.goodcompany.com/redirect?url=www.myphishingsite.com", and an unsuspecting other user may trust the URL because of the domain name "goodcompany.com".

Example techniques discussed herein may provide service-generated redirect URLs for unauthenticated client applications that may reduce the risk of phishing attacks.

According to example embodiments, a service may generate short-lived, and/or one-time-use redirect URLs, without client authentication, which may be validated based on a comparison of originating locations of the request for the redirect URL and the request to be redirected based on a transmission of the generated redirect URL. If the originating locations of the two requests do not match, or are not otherwise determined to be similar, then the request for redirection may be declined, and an error message may be sent to the requestor.

According to an example embodiment, the service may generate the redirect URL and may store it (e.g., in a list) using a redirect URL identifier. The redirect URL may be associated with, or may include, an originating transmission location associated with the client requesting the redirect URL. For example, the originating transmission location may include an Internet Protocol (IP) address from which the client transmits the request for the redirect URL to be generated by the service. According to an example embodiment, the service may then send a redirect request to the requesting client, the redirect request including a retransmission URL (e.g., a URL for transmission of the request to redirect the client) and an indication of the redirect URL identifier. When the service receives the redirect request, the service may then retrieve the redirect URL, based on the redirect URL identifier, and may compare the originating transmission location associated with the client requesting the redirect URL that is stored with the redirect URL, with an originating transmission location associated with the transmission to the service, of the redirect request. If the two originating transmission locations do not match, or are not determined to be similar, the service may decline the redirect request. Thus, if a phishing user obtains a redirect request from the service, then the redirection may not be performed if the redirect request is transmitted from another user.

According to an example embodiment, the service may perform the redirection if a match (or similarity) is determined, and the redirect URL may be removed from storage.

If there is no redirect URL associated with the redirect URL identifier, then the redirect URL may have expired, or may have not existed.

According to an example embodiment, the service may remove redirect URLs older than a predetermined age, for example, in a background process.

According to an example embodiment, the service may include information in the redirect request that identifies the originating transmission location associated with the client requesting the redirect URL, in lieu of storing the redirect request. According to an example embodiment, the originating transmission location associated with the client requesting the redirect URL may be encoded (or encrypted), and placed in a predetermined arrangement in the redirect request. The requested URL for which the client requests redirection may also be encoded in the redirect request. According to an example embodiment, the service may decode the redirect request after receiving it from a requestor, and may determine whether the two originating transmission locations match, or are similar, as discussed above.

Figure 1:
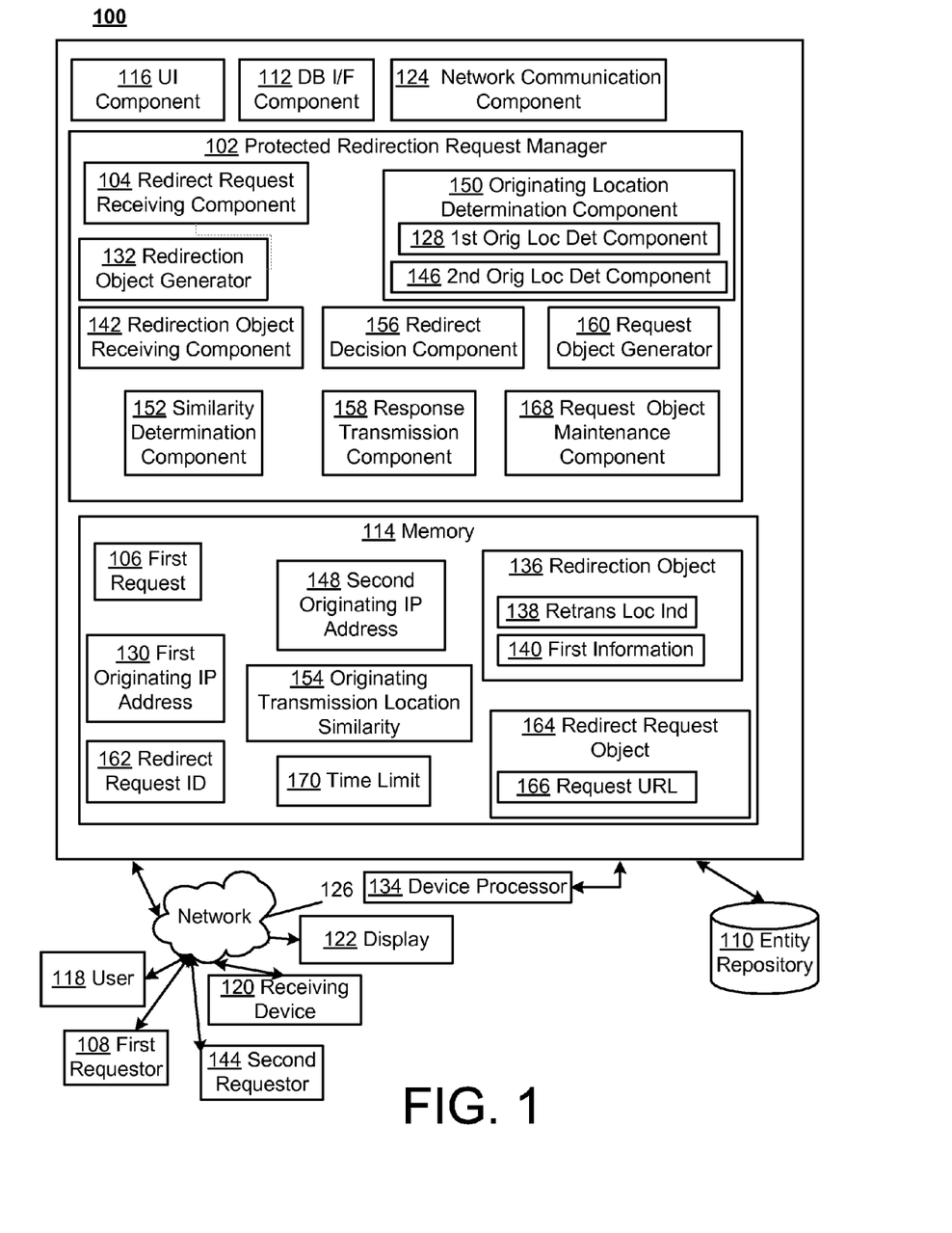
FIG. 1 is a block diagram of an example system for protected redirection requests.

As further discussed herein, FIG. 1 is a block diagram of a system 100 for protected redirection requests. As shown in FIG. 1, a system 100 may include a protected redirection request manager 102 that includes a redirect request receiving component 104 that may obtain a first request 106 from a first originating requestor 108 for a redirection Uniform Resource Locator (URL). For example, the first request 106 may include a request for a redirection URL to a web site that is of interest to the first originating requestor 108.

According to an example embodiment, the protected redirection request manager 102 may include executable instructions that may be stored on a computer-readable storage medium, as discussed below. According to an example embodiment, the computer-readable storage medium may include any number of storage devices, and any number of storage media types, including distributed devices.

For example, an entity repository 110 may include one or more databases, and may be accessed via a database interface component 112. One skilled in the art of data processing will appreciate that there are many techniques for storing repository information discussed herein, such as various types of database configurations (e.g., SQL SERVERS) and non-database configurations.

According to an example embodiment, the protected redirection request manager 102 may include a memory 114 that may store the first request 106. In this context, a "memory" may include a single memory device or multiple memory devices configured to store data and/or instructions. Further, the memory 114 may span multiple distributed storage devices.

According to an example embodiment, a user interface component 116 may manage communications between a user 118 and the protected redirection request manager 102. The user 118 may be associated with a receiving device 120 that may be associated with a display 122 and other input/output devices. For example, the display 122 may be configured to communicate with the receiving device 120, via internal device bus communications, or via at least one network connection.

According to an example embodiment, the protected redirection request manager 102 may include a network communication component 124 that may manage network communication between the protected redirection request manager 102 and other entities that may communicate with the protected redirection request manager 102 via at least one network 126. For example, the at least one network 126 may include at least one of the Internet, at least one wireless network, or at least one wired network. For example, the at least one network 126 may include a cellular network, a radio network, or any type of network that may support transmission of data for the protected redirection request manager 102. For example, the network communication component 124 may manage network communications between the protected redirection request manager 102 and the receiving device 120. For example, the network communication component 124 may manage network communication between the user interface component 116 and the receiving device 120.

A first originating location determination component 128 may determine a first originating Internet Protocol (IP) address 130 associated with an originating transmission of the first request 106.

A redirection object generator 132 may generate, via a device processor 134, a first redirection object 136 that includes a retransmission location indicator 138 and first information 140 associated with identification of the first originating IP address 130.

In this context, a "processor" may include a single processor or multiple processors configured to process instructions associated with a processing system. A processor may thus include multiple processors processing instructions in parallel and/or in a distributed manner. Although the device processor 134 is depicted as external to the protected redirection request manager 102 in FIG. 1, one skilled in the art of data processing will appreciate that the device processor 134 may be implemented as a single component, and/or as distributed units which may be located internally or externally to the protected redirection request manager 102, and/or any of its elements.

A redirection object receiving component 142 may obtain the first redirection object 136 transmitted from a second originating requestor 144.

A second originating location determination component 146 may determine a second originating IP address 148 associated with an originating transmission of the first redirection object 136 from the second originating requestor 144. According to example embodiments, the first originating location determination component 128 and the second originating location determination component 146 may be the same component, or may both be included in an originating location determination component 150. According to example embodiments, the first originating location determination component 128 and the second originating location determination component 146 may be located on separate devices.

A similarity determination component 152 may determine an originating transmission location similarity 154 between the first originating IP address 130 and the second originating IP address 148. For example, the originating transmission location similarity 154 may be based on equality, or a geographic proximity of a host of the first originating IP address 130 to a host of the second originating IP address 148.

A redirect decision component 156 may determine whether to initiate a redirection associated with the first redirection object 136, based on the determined originating transmission location similarity 154. For example, if the similarity determination component 152 determines that the first originating IP address 130 and the second originating IP address 148 are equal (or similar), then the redirect decision component 156 determine that a redirection will be initiated.

According to an example embodiment, the first request 106 may include a request URL associated with a destination network location requested for redirection of a requesting client associated with the first originating requestor 108, the requesting client associated with the originating transmission of the first request 106 from the first originating IP address 130.

According to an example embodiment, the second originating requestor 144 may include the first originating requestor 108.

According to an example embodiment, the similarity determination component 152 may determine the originating transmission location similarity 154 between the first originating IP address 130 and the second originating IP address 148 based on one or more of determining that the first originating IP address 130 and the second originating IP address 148 are equal, determining that the second originating IP address 148 is hosted within a predetermined geographic radius of a hosting of the first originating IP address 130, or determining that the first originating IP address 130 and the second originating IP address 148 share a common client ownership associated with the first originating requestor 108 and the second originating requestor 144. For example, if the first originating IP address 130 and the second originating IP address 148 are both owned by a major, trustworthy corporation for business use by its in-house employees, then a similarity may be determined.

According to an example embodiment, a response transmission component 158 may initiate transmission of the first redirection object 136 via a response to the first originating requestor 108.

According to an example embodiment, the retransmission location indicator 138 may include a retransmission URL associated with a network location indicating a target network location for transmission of the generated first redirection object 136 from a recipient of the generated first redirection object 136. For example, the retransmission URL may be associated with a service that may process the generated first redirection object 136 upon receipt from the recipient of the generated first redirection object 136.

According to an example embodiment, the retransmission location indicator 138 may include a retransmission URL associated with a network location indicating a target network location for transmission of the generated first redirection object 136 from a recipient of the generated first redirection object 136.

According to an example embodiment, the first information 140 may include an encrypted identification of the first originating IP address 130.

According to an example embodiment, a request object generator 160 may generate a first redirect request identifier 162 and a first redirect request object 164 that includes a request URL 166 associated with a network location requested for redirection.

According to an example embodiment, a request object maintenance component 168 may initiate storage of the first redirect request object 164, based on a storage location identifier included in the first redirect request identifier 162. For example, the first redirect object 164 may be stored on one or more servers associated with processing redirection objects for redirection of clients.

According to an example embodiment, the redirect request generator 132 may generate, via the device processor 134, the first redirection object 136 that includes the retransmission location indicator 138 and the first information 140 associated with identification of the first originating IP address 130, the first information 140 including the first redirect request identifier 162.

According to an example embodiment, the request object maintenance component 168 may initiate storage of the first redirect request object 164, based on the storage location identifier included in the first redirect request identifier 162, wherein the storage location identifier indicates a location in a list of maintained redirect request objects 164 on one or more servers associated with a first service.

According to an example embodiment, the first redirect request object 164 may be associated with a time limit 170 for removal of the first redirect request object from the list of maintained redirect request objects on the one or more servers associated with the first service.

Figure 2A:
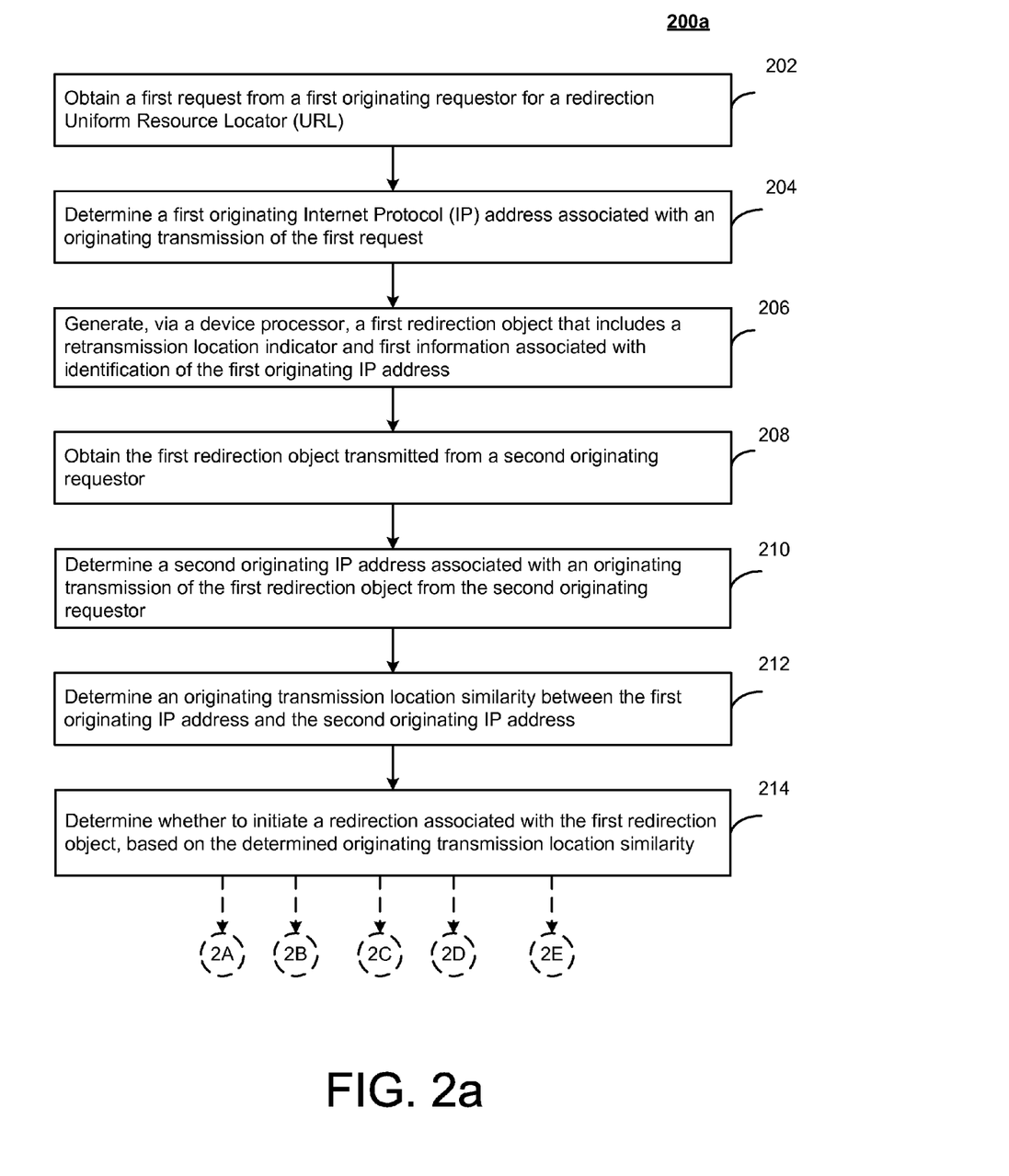
FIG. 2 is a flowchart illustrating example operations of the system of FIG. 1.

FIG. 2 is a flowchart illustrating example operations of the system of FIG. 1, according to example embodiments. In the example of FIG. 2a, a first request may be obtained from a first originating requestor for a redirection URL (202). For example, the redirect request receiving component 104 may obtain the first request 106 from the first originating requestor 108, as discussed above.

A first originating Internet Protocol (IP) address associated with an originating transmission of the first request may be determined (204). For example, the first originating location determination component 128 may determine the first originating Internet Protocol (IP) address 130 associated with the originating transmission of the first request 106, as discussed above.

A first redirection object that includes a retransmission location indicator and first information associated with identification of the first originating IP address may be generated, via a device processor (206). For example, the redirection object generator 132 may generate, via the device processor 134, the first redirection object 136 that includes the retransmission location indicator 138 and first information 140 associated with identification of the first originating IP address 130, as discussed above.

The first redirection object transmitted from a second originating requestor may be obtained (208). For example, the redirection object receiving component 142 may obtain the first redirection object 136 transmitted from a second originating requestor 144, as discussed above.

A second originating IP address associated with an originating transmission of the first redirection object from the second originating requestor may be determined (210). For example, the second originating location determination component 146 may determine the second originating IP address 148 associated with the originating transmission of the first redirection object 136 from the second originating requestor 144, as discussed above.

An originating transmission location similarity between the first originating IP address and the second originating IP address may be determined (212). For example, the similarity determination component 152 may determine the originating transmission location similarity 154 between the first originating IP address 130 and the second originating IP address 148, as discussed above.

A determination may be made whether to initiate a redirection associated with the first redirection object, based on the determined originating transmission location similarity (214). For example, the redirect decision component 156 may determine whether to initiate a redirection associated with the redirection object 136, based on the determined originating transmission location similarity 154, as discussed above.

Figure 2B:
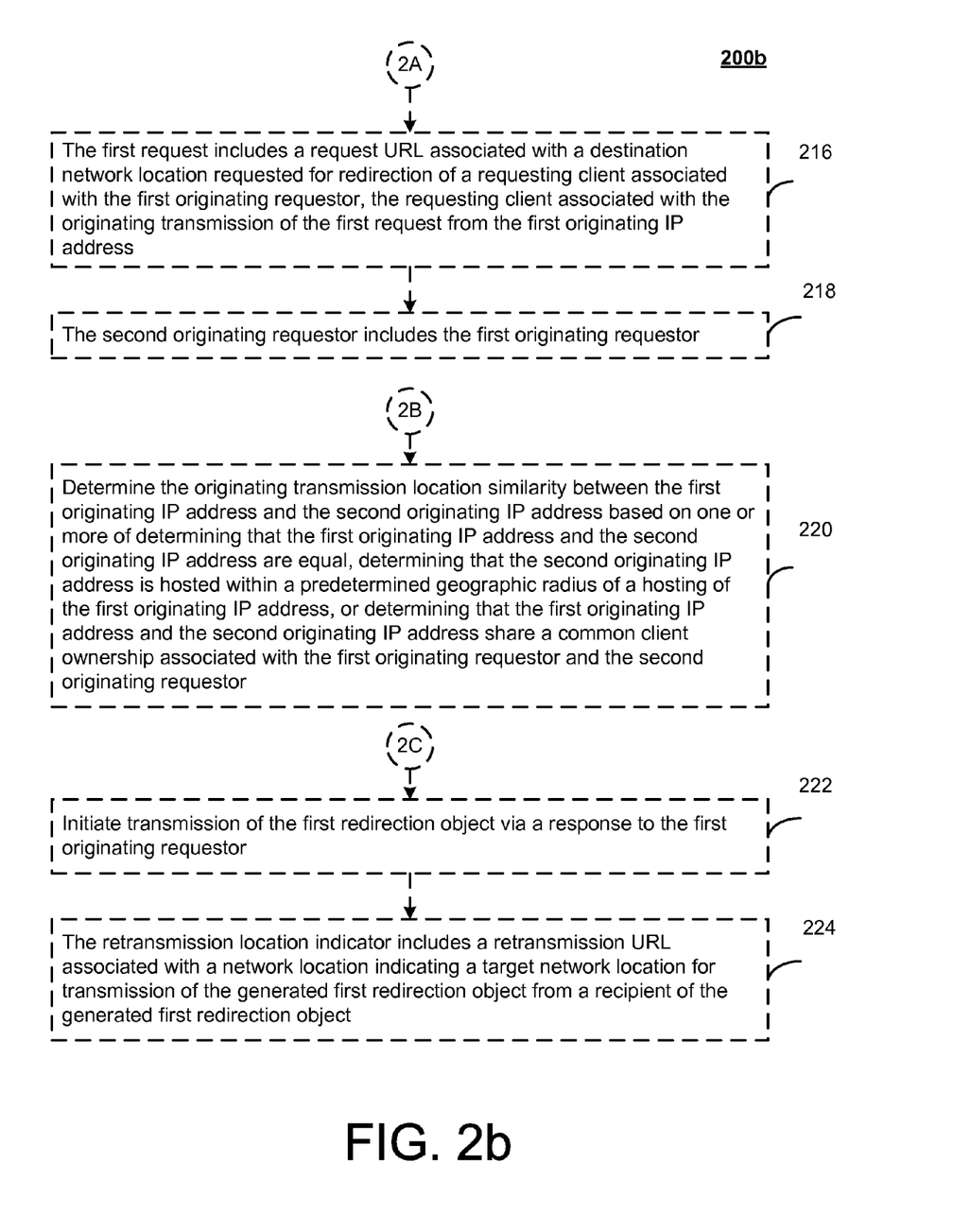

According to an example embodiment, the first request 106 may include a request URL associated with a network location requested for redirection of a requesting client associated with the first originating requestor 108, the requesting client associated with the originating transmission of the first request 106 from the first originating IP address 130 (216).

According to an example embodiment, the second originating requestor 144 may include the first originating requestor 108 (218).

According to an example embodiment, the originating transmission location similarity between the first originating IP address and the second originating IP address may be determined based on one or more of determining that the first originating IP address and the second originating IP address are equal, determining that the second originating IP address is hosted within a predetermined geographic radius of a hosting of the first originating IP address, or determining that the first originating IP address and the second originating IP address share a common client ownership associated with the first originating requestor and the second originating requestor (220). For example, the similarity determination component 152 may determine the originating transmission location similarity 154 between the first originating IP address 130 and the second originating IP address 148 based on one or more of determining that the first originating IP address 130 and the second originating IP address 148 are equal, determining that the second originating IP address 148 is hosted within a predetermined geographic radius of a hosting of the first originating IP address 130, or determining that the first originating IP address 130 and the second originating IP address 148 share a common client ownership associated with the first originating requestor 108 and the second originating requestor 144, as discussed above.

According to an example embodiment, transmission of the first redirection object may be initiated via a response to the first originating requestor (222). For example, the response transmission component 158 may initiate transmission of the first redirection object 136 via a response to the first originating requestor 108, as discussed above.

According to an example embodiment, the retransmission location indicator may include a retransmission URL associated with a network location indicating a target network location for transmission of the generated first redirection object from a recipient of the generated first redirection object (224).

According to an example embodiment, the retransmission location indicator may include a retransmission URL associated with a network location indicating a target network location for transmission of the generated first redirection object from a recipient of the generated first redirection object (226).

According to an example embodiment, the first information may include an encrypted identification of the first originating IP address (228).

Figure 2C:
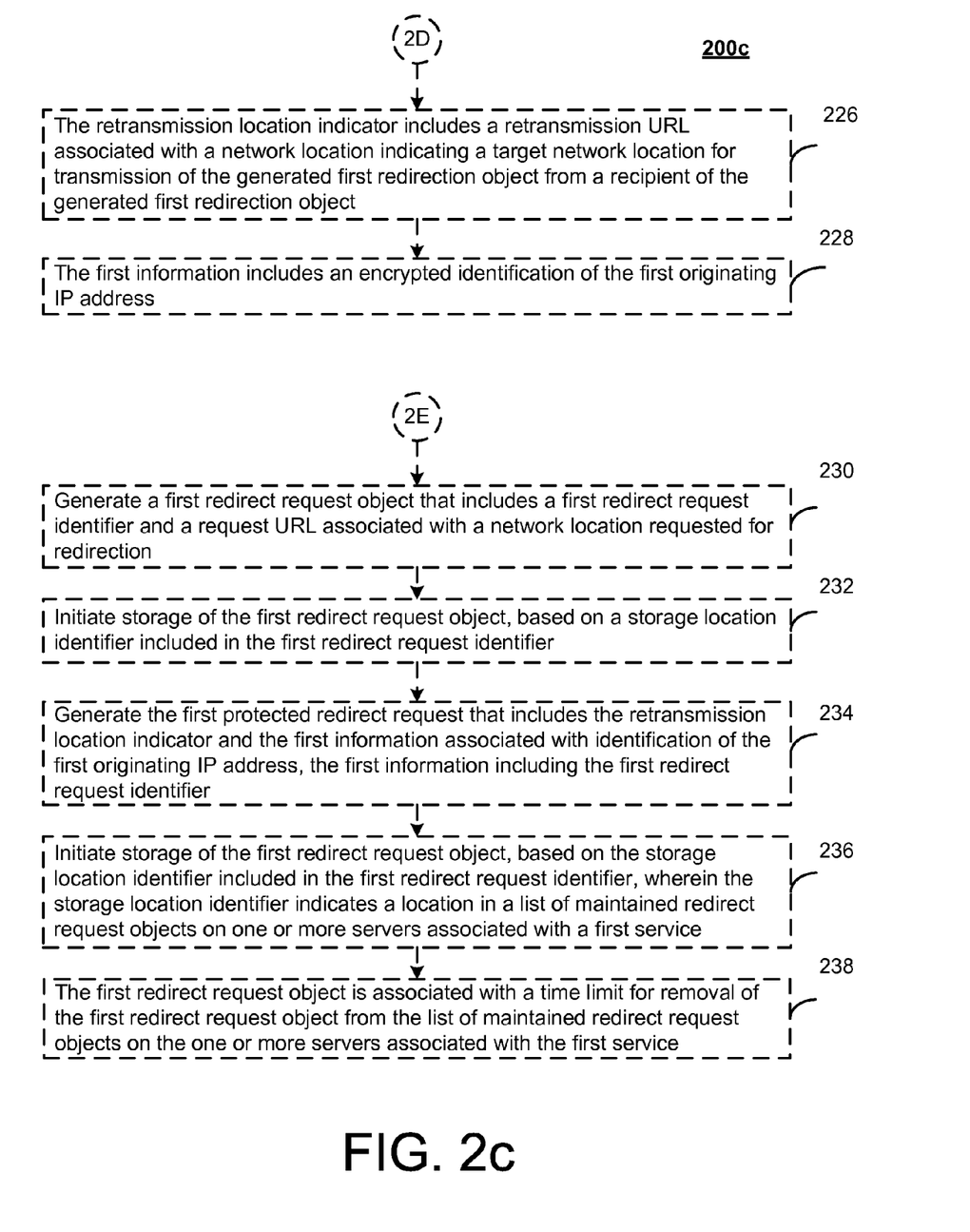

According to an example embodiment, a first redirect request identifier and a first redirect request object that includes a request URL associated with a network location requested for redirection may be generated (230). For example, the request object generator 160 may generate the first redirect request identifier 162 and the first redirect request object 164 that includes the request URL 166 associated with a network location requested for redirection, as discussed above.

According to an example embodiment, storage of the first redirect request object may be initiated, based on a storage location identifier included in the first redirect request identifier (232). For example, the request object maintenance component 168 may initiate storage of the first redirect request object 164, based on a storage location identifier included in the first redirect request identifier 162, as discussed above.

According to an example embodiment, the first redirection object that includes the retransmission location indicator and the first information associated with identification of the first originating IP address may be generated, the first information including the first redirect request identifier (234). For example, the redirect request generator 132 may generate, via the device processor 134, the first redirection object 136 that includes the retransmission location indicator 138 and the first information 140 associated with identification of the first originating IP address 130, the first information 140 including the first redirect request identifier 162, as discussed above.

According to an example embodiment, storage of the first redirect request object may be initiated, based on the storage location identifier included in the first redirect request identifier, wherein the storage location identifier indicates a location in a list of maintained redirect request objects on one or more servers associated with a first service (236). For example, the request object maintenance component 168 may initiate storage of the first redirect request object 164, based on the storage location identifier included in the first redirect request identifier 162, wherein the storage location identifier indicates a location in a list of maintained redirect request objects 164 on one or more servers associated with a first service, as discussed above.

According to an example embodiment, the first redirect request object may be associated with the time limit 170 for removal of the first redirect request object from the list of maintained redirect request objects on the one or more servers associated with the first service (238).

FIG. 3 is a flowchart illustrating example operations of the system of FIG. 1, according to example embodiments. In the example of FIG. 3*a*, a redirection object may be obtained, based on a current request of a current requestor, the redirection object associated with a response to a previous request for a redirection to a destination network location, the previous request associated with a previous requestor (302). For example, the protected request receiving component 142 may obtain the first redirection object 136, as discussed above.

Figure 3A:
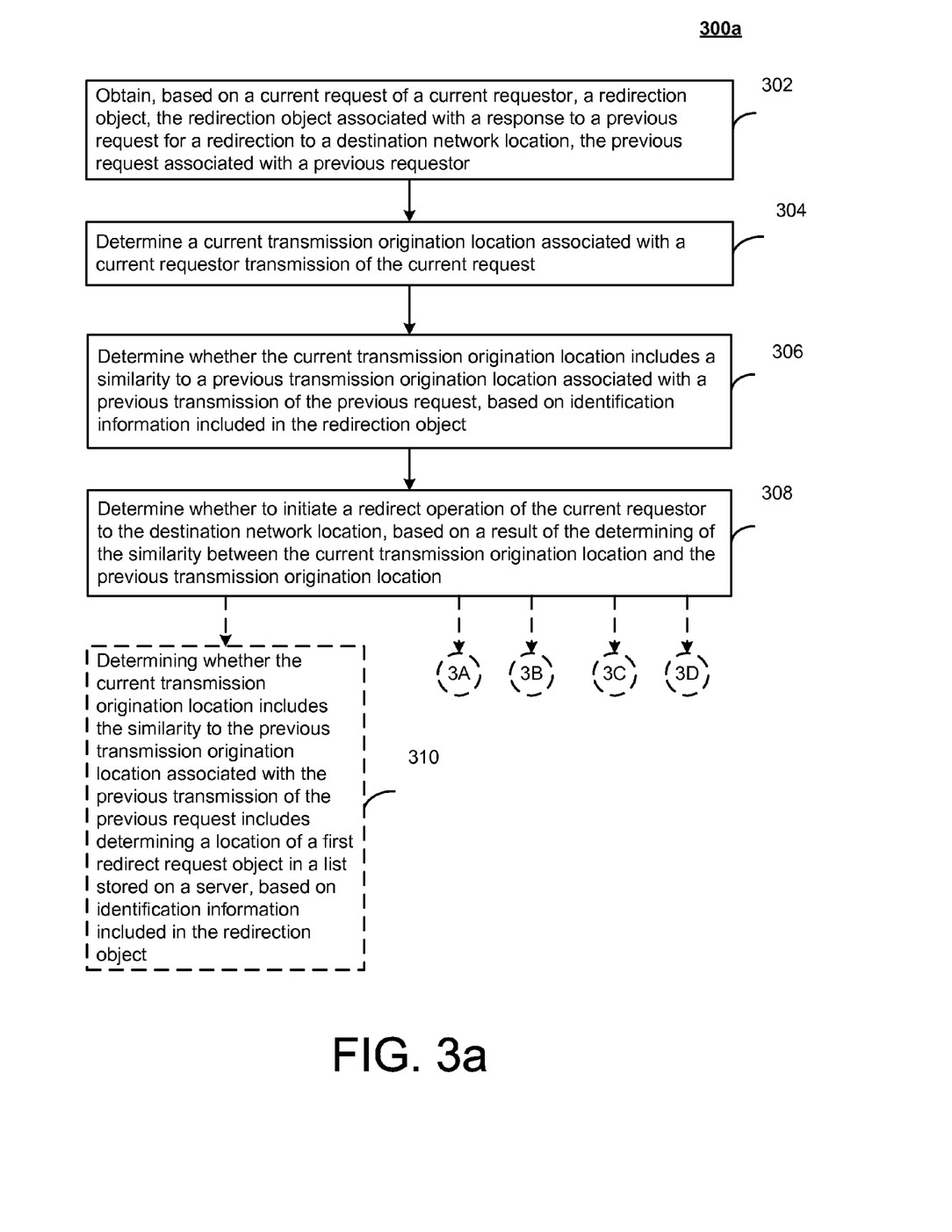
FIG. 3 is a flowchart illustrating example operations of the system of FIG. 1.

A current transmission origination location associated with a current requestor transmission of the current request may be determined (304). For example, the second originating location determination component 146 may determine a second originating IP address 148 associated with an originating transmission of the first redirection object 136 from the second originating requestor 144, as discussed above.

It may be determined whether the current transmission origination location includes a similarity to a previous transmission origination location associated with a previous transmission of the previous request, based on identification information included in the redirection object (306). For example, the similarity determination component 152 may determine the originating transmission location similarity 154 between the first originating IP address 130 and the second originating IP address 148, as discussed above. For example, the originating transmission location similarity 154 may be determined based on one or more sets of Global Positioning System (GPS) coordinates associated with one or more requestors.

A determination may be made whether to initiate a redirect operation of the current requestor to the destination network location, based on a result of the determining of the similarity between the current transmission origination location and the previous transmission origination location (308). For example, the redirect decision component 156 may determine whether to initiate a redirection associated with the first redirection object 136, based on the determined originating transmission location similarity 154, as discussed above.

Figure 3B:
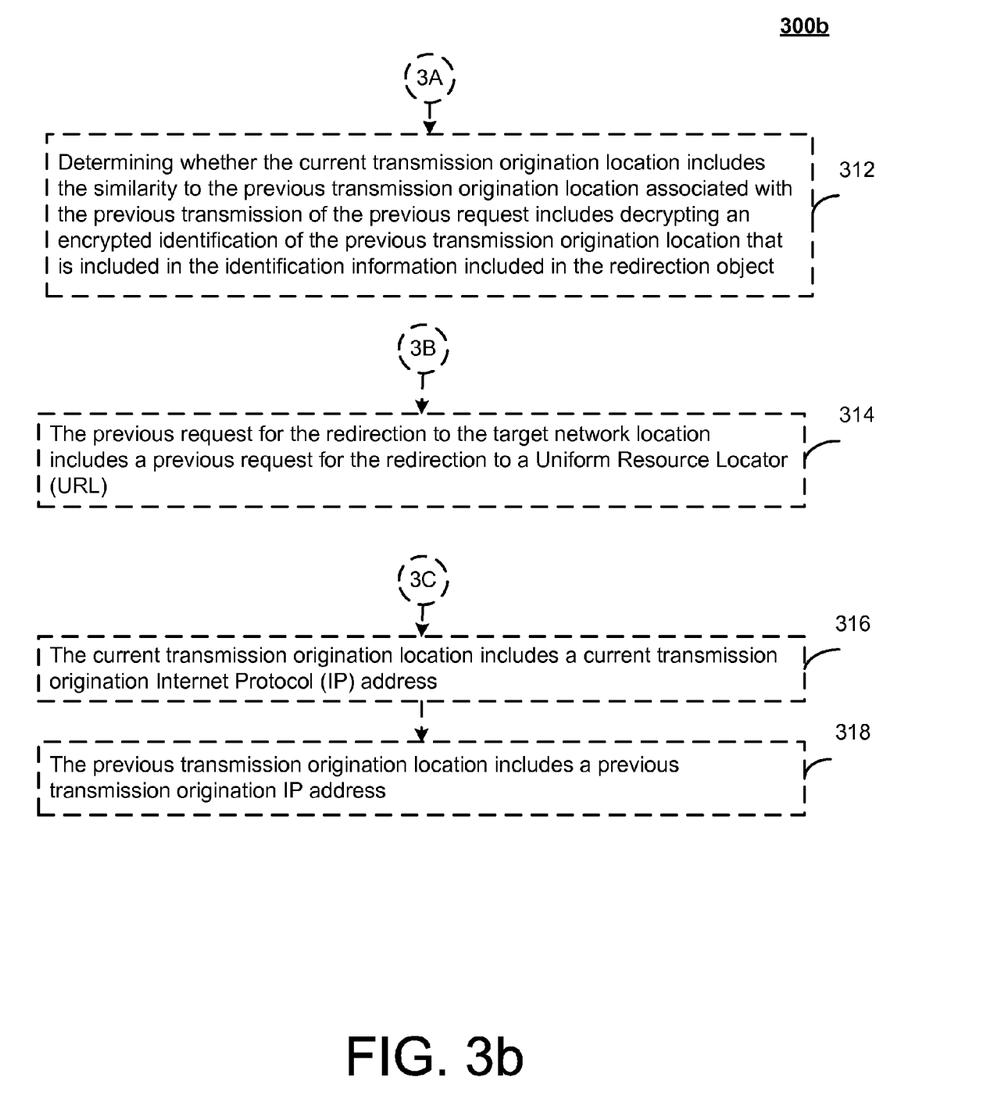

According to an example embodiment, determining whether the current transmission origination location includes the similarity to the previous transmission origination location associated with the previous transmission of the previous request may include determining a location of a first redirect request object in a list stored on a server, based on identification information included in the redirection object (310). For example, the request object maintenance component 168 may initiate storage of the first redirect request object 164, based on the storage location identifier included in the first redirect request identifier 162, wherein the storage location identifier indicates a location in a list of maintained redirect request objects 164, as discussed above.

According to an example embodiment, determining whether the current transmission origination location includes the similarity to the previous transmission origination location associated with the previous transmission of the previous request may include decrypting an encrypted identification of the previous transmission origination location that is included in the identification information included in the redirection object (312). For example, the first information 140 may include an encrypted identification of the first originating IP address 130, as discussed above.

According to an example embodiment, the previous request for the redirection to the destination network location may include a previous request for the redirection to a Uniform Resource Locator (URL) (314).

According to an example embodiment, the current transmission origination location may include a current transmission origination Internet Protocol (IP) address (316).

According to an example embodiment, the previous transmission origination location may include a previous transmission origination IP address (318).

Figure 3C:
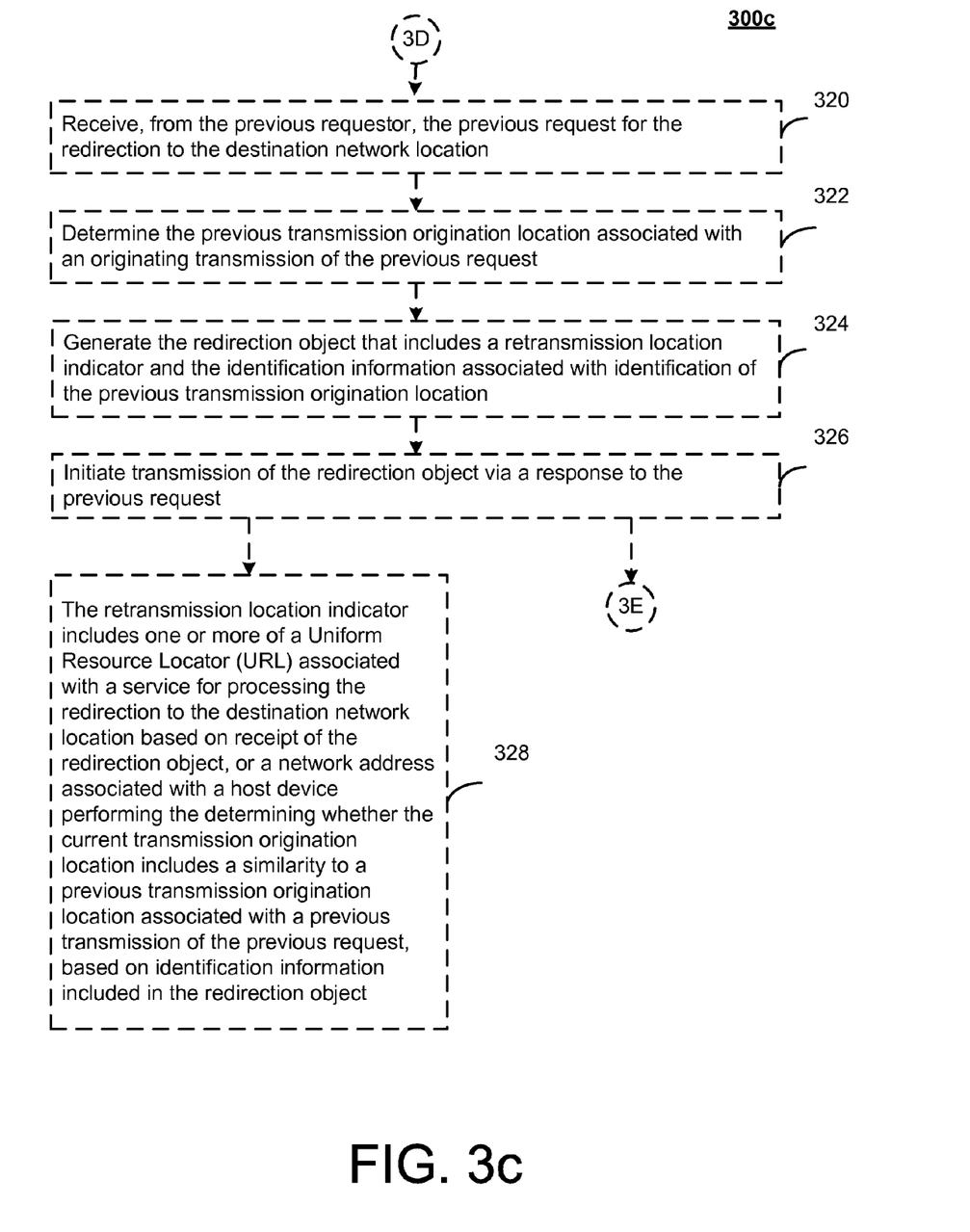

According to an example embodiment, the previous request for the redirection to the destination network location may be received from the previous requestor (320).

According to an example embodiment, the previous transmission origination location associated with an originating transmission of the previous request may be determined (322). For example, the first originating location determination component 128 may determine the first originating Internet Protocol (IP) address 130 associated with an originating transmission of the first request 106, as discussed above.

According to an example embodiment, the redirection object that includes a retransmission location indicator and the identification information associated with identification of the previous transmission origination location may be generated, via a device processor (324). For example, the redirection object generator 132 may generate, via the device processor 134, the first redirection object 136 that includes the retransmission location indicator 138 and first information 140 associated with identification of the first originating IP address 130, as discussed above.

According to an example embodiment, transmission of the redirection object may be initiated via a response to the previous request (326). For example, the response transmission component 158 may initiate transmission of the first redirection object 136 via a response to the first originating requestor 108, as discussed above.

According to an example embodiment, the retransmission location indicator 138 may include one or more of a Uniform Resource Locator (URL) associated with a service for processing the redirection to the destination network location based on receipt of the redirection object 136, or a network address associated with a host device performing the determining whether the current transmission origination location includes a similarity to a previous transmission origination location associated with a previous transmission of the previous request 106, based on identification information included in the redirection object 136 (328).

Figure 3D:
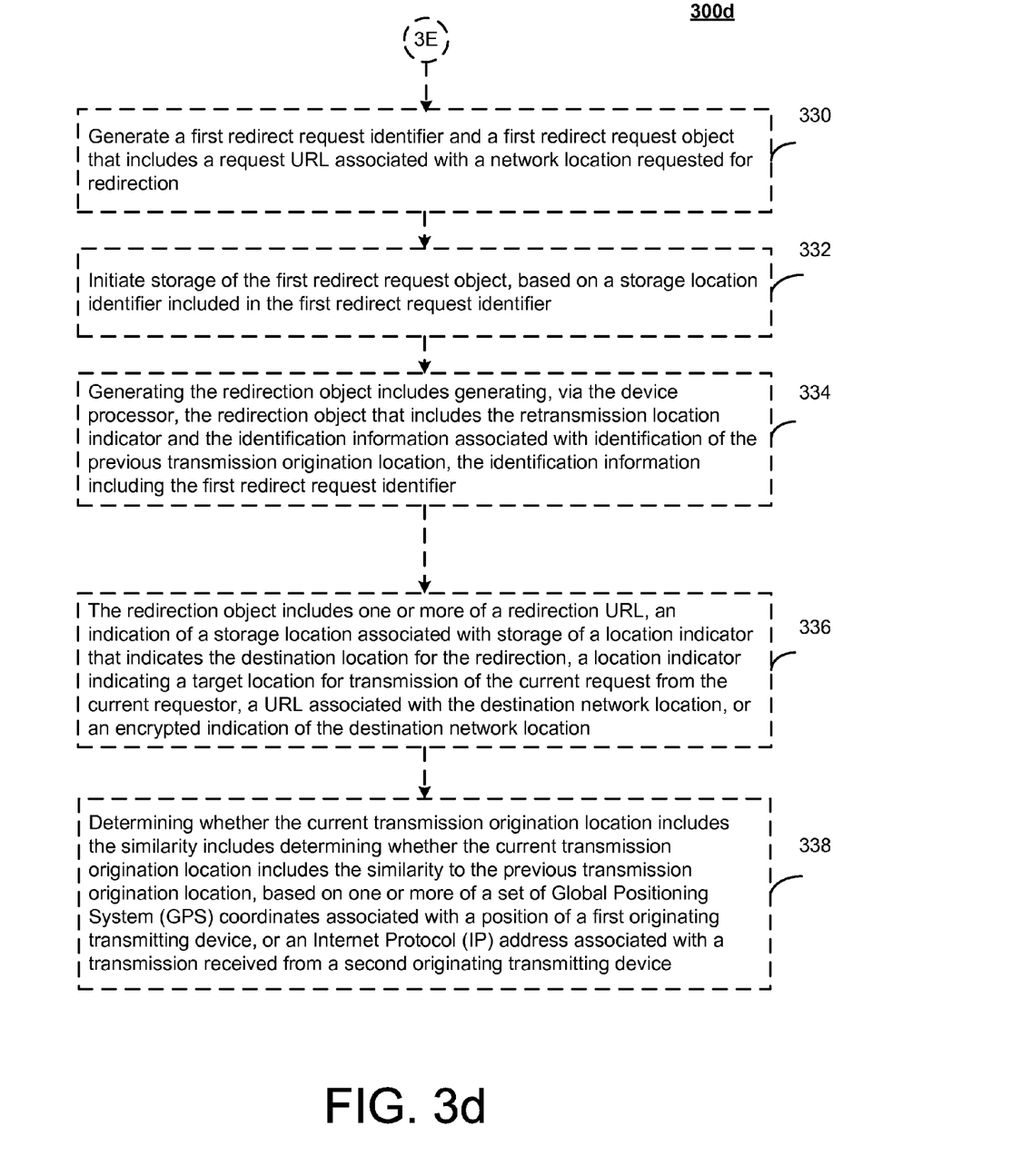

According to an example embodiment, a first redirect request identifier 162 and a first redirect request object 164 that includes a request URL associated with the destination network location requested for redirection may be generated (330). For example, the request object generator 160 may generate a first redirect request identifier 162 and a first redirect request object 164 that includes a request URL 166 associated with a destination network location requested for redirection, as discussed above.

According to an example embodiment, storage of the first redirect request object may be initiated, based on a storage location identifier included in the first redirect request identifier (332). For example, the request object maintenance component 168 may initiate storage of the first redirect request object 164, based on a storage location identifier included in the first redirect request identifier 162, as discussed above.

According to an example embodiment, generating, via the device processor, the redirection object may include generating, via the device processor, the redirection object that includes the retransmission location indicator and the identification information associated with identification of the previous transmission origination location, the identification information including the first redirect request identifier (334). For example, the redirection object generator 132 may generate, via the device processor 134, the redirection object 136 that includes the retransmission location indicator 138 and first information 140 including the first redirect request identifier 162, as discussed above.

According to an example embodiment, the redirection object may include one or more of a redirection URL, an indication of a storage location associated with storage of a location indicator that indicates the destination location for the redirection, a location indicator indicating a target location for transmission of the current request from the current requestor, a URL associated with the destination network location, or an encrypted indication of the destination network location (336).

According to an example embodiment, determining whether the current transmission origination location includes the similarity may include determining whether the current transmission origination location includes the similarity to the previous transmission origination location, based on one or more of a set of Global Positioning System (GPS) coordinates associated with a position of a first originating transmitting device, or an Internet Protocol (IP) address associated with a transmission received from a second originating transmitting device (338).

Figure 4:
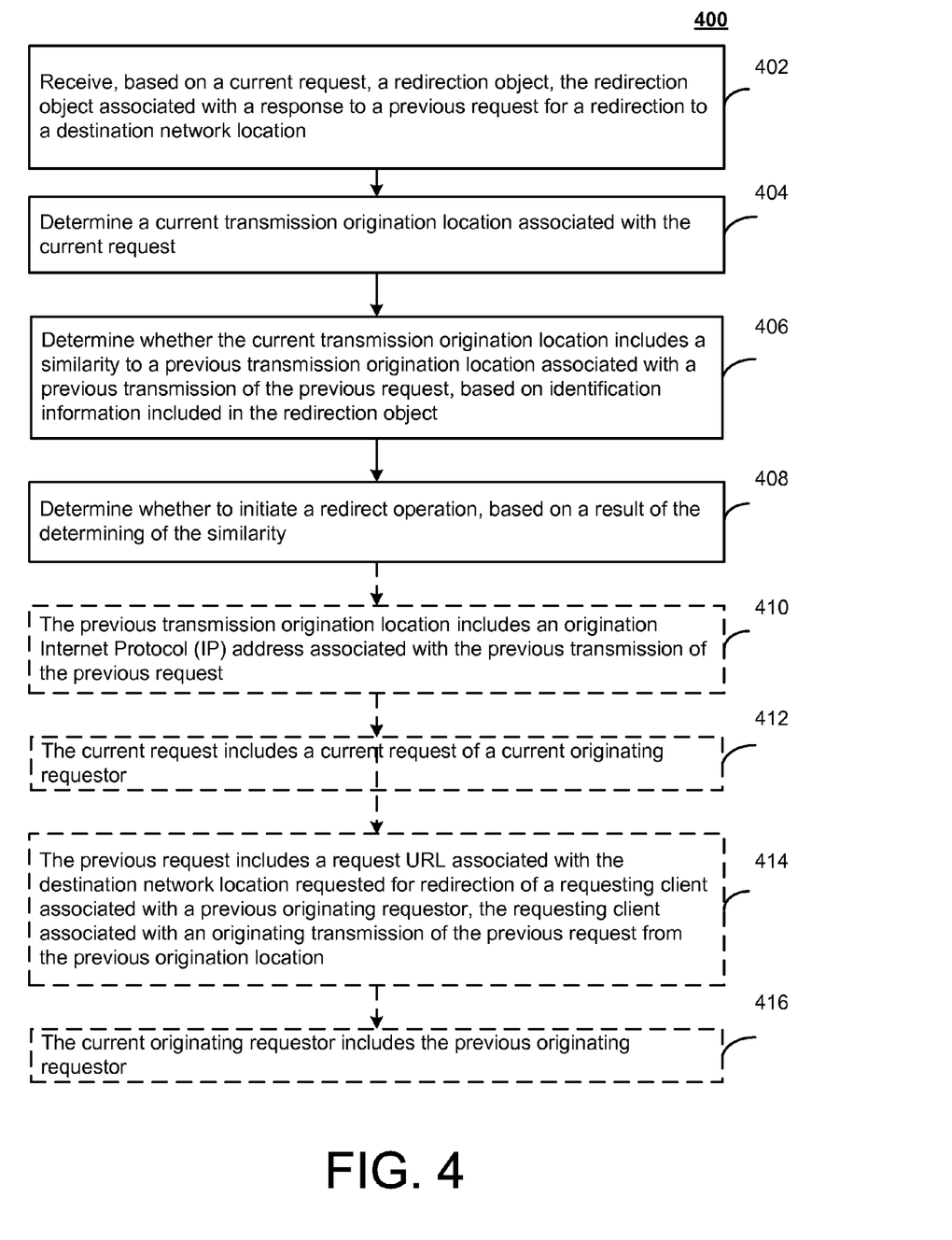
FIG. 4 is a flowchart illustrating example operations of the system of FIG. 1.

FIG. 4 is a flowchart illustrating example operations of the system of FIG. 1, according to example embodiments. In the example of FIG. 4, a redirection object may be received, based on a current request, the redirection object associated with a response to a previous request for a redirection to a destination network location (402). For example, the redirection object receiving component 142 may obtain the first redirection object 136 transmitted from the second originating requestor 144, as discussed above.

A current transmission origination location associated with the current request may be determined (404). For example, the second originating location determination component 146 may determine a second originating IP address 148 associated with an originating transmission of the first redirection object 136 from the second originating requestor 144, as discussed above.

It may be determined whether the current transmission origination location includes a similarity to a previous transmission origination location associated with a previous transmission of the previous request, based on identification information included in the redirection object (406). For example, the similarity determination component 152 may determine an originating transmission location similarity 154 between the first originating IP address 130 and the second originating IP address 148, as discussed above.

A determination may be made whether to initiate a redirect operation, based on a result of the determining of the similarity between the current transmission origination location and the previous transmission origination location (408). For example, the redirect decision component 156 may determine whether to initiate a redirection associated with the first redirection object 136, based on the determined originating transmission location similarity 154, as discussed above.

According to an example embodiment, the previous transmission origination location may include an origination Internet Protocol (IP) address associated with the previous transmission of the previous request (410).

According to an example embodiment, the current request may include a current request of a current originating requestor (412).

According to an example embodiment, the previous request may include a request URL associated with the destination network location requested for redirection of a requesting client associated with the previous originating requestor, the requesting client associated with an originating transmission of the previous request from the previous origination location (414).

According to an example embodiment, the current originating requestor 144 may include the previous originating requestor 108 (416).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a redirect request receiving component that obtains a first request from a first originating unauthenticated requestor for a redirection Uniform Resource Locator (URL);
a first originating location determination component that determines a first originating Internet Protocol (IP) address associated with an originating transmission of the first request;
a redirection object generator that generates, via a device processor, a first redirection object that includes a retransmission location indicator and first information associated with identification of the first originating IP address, without authentication of the first originating unauthenticated requestor;
a response transmission component that initiates transmission of the first redirection object via a response to the first originating unauthenticated requestor, in response to the first request for the redirection URL;
a redirection object receiving component that obtains the first redirection object transmitted from a second originating unauthenticated requestor;
a second originating location determination component that determines a second originating IP address associated with an originating transmission of the first redirection object from the second originating unauthenticated requestor;
a similarity determination component that determines an originating transmission location similarity between the first originating IP address and the second originating IP address; and
a redirect decision component that determines whether to initiate a redirection associated with the first redirection object, based on the determined originating transmission location similarity, without authentication of the first originating unauthenticated requestor or the second originating unauthenticated requestor.

2. The system of claim 1, wherein:
the first request includes a request URL associated with a destination network location requested for redirection of a requesting unauthenticated client associated with the first originating unauthenticated requestor, the requesting unauthenticated client associated with the originating transmission of the first request from the first originating IP address, wherein
the second originating unauthenticated requestor includes the first originating unauthenticated requestor.

3. The system of claim 1, wherein:
the similarity determination component determines the originating transmission location similarity between the first originating IP address and the second originating IP address based on one or more of:
 determining that the first originating IP address and the second originating IP address are equal,
 determining that the second originating IP address is hosted within a predetermined geographic radius of a hosting of the first originating IP address, or
 determining that the first originating IP address and the second originating IP address share a common client ownership associated with the first originating unauthenticated requestor and the second originating unauthenticated requestor.

4. The system of claim 1, wherein:
the retransmission location indicator includes a retransmission URL associated with a network location indicating a target network location for transmission of the generated first redirection object from a recipient of the generated first redirection object.

5. The system of claim 1, wherein:
the retransmission location indicator includes a retransmission URL associated with a network location indicating a target network location for transmission of the generated first redirection object from a recipient of the generated first redirection object, and
the first information includes an encrypted identification of the first originating IP address.

6. The system of claim 1, further comprising:
a request object generator that generates a first redirect request identifier and a first redirect request object that includes a request URL associated with a network location requested for redirection; and
a request object maintenance component that initiates storage of the first redirect request object, based on a storage location identifier included in the first redirect request identifier,
wherein the redirect request generator generates, via the device processor, the first redirection object that includes the retransmission location indicator and the first information associated with identification of the first originating IP address, the first information including the first redirect request identifier.

7. The system of claim 6, wherein:
the request object maintenance component initiates storage of the first redirect request object, based on the storage location identifier included in the first redirect request identifier, wherein the storage location identifier indicates a location in a list of maintained redirect request objects on one or more servers associated with a first service.

8. The system of claim 7, wherein:
the first redirect request object is associated with a time limit for removal of the first redirect request object from the list of maintained redirect request objects on the one or more servers associated with the first service.

9. A method comprising:
obtaining, based on a current request of a current unauthenticated requestor, a redirection object, the redirection object associated with a response to a previous request for a redirection to a destination network location, the previous request associated with a previous unauthenticated requestor, the redirection object previously generated in response to the previous request and transmitted to the previous unauthenticated requestor in response to the previous request, without authentication of the previous unauthenticated requestor;

determining a current transmission origination location associated with a current unauthenticated requestor transmission of the current request;

determining whether the current transmission origination location includes a similarity to a previous transmission origination location associated with a previous transmission of the previous request, based on identification information included in the redirection object; and determining whether to initiate a redirect operation of the current unauthenticated requestor to the destination network location, based on a result of the determining of the similarity between the current transmission origination location and the previous transmission origination location.

10. The method of claim 9, wherein:
determining whether the current transmission origination location includes the similarity to the previous transmission origination location associated with the previous transmission of the previous request includes determining a location of a first redirect request object in a list stored on a server, based on identification information included in the redirection object.

11. The method of claim 9, wherein:
determining whether the current transmission origination location includes the similarity to the previous transmission origination location associated with the previous transmission of the previous request includes decrypting an encrypted identification of the previous transmission origination location that is included in the identification information included in the redirection object.

12. The method of claim 9, wherein:
the previous request for the redirection to the destination network location includes a previous request for the redirection to a Uniform Resource Locator (URL).

13. The method of claim 9, wherein:
the current transmission origination location includes a current transmission origination Internet Protocol (IP) address, and
the previous transmission origination location includes a previous transmission origination IP address.

14. The method of claim 9, further comprising:
receiving, from the previous unauthenticated requestor, the previous request for the redirection to the destination network location;
determining the previous transmission origination location associated with an originating transmission of the previous request;
generating, via a device processor, the redirection object that includes a retransmission location indicator and the identification information associated with identification of the previous transmission origination location, without authentication of the previous unauthenticated requestor; and
initiating transmission of the redirection object via a response to the previous request.

15. The method of claim 14, wherein:
the retransmission location indicator includes one or more of:
a Uniform Resource Locator (URL) associated with a service for processing the redirection to the destination network location based on receipt of the redirection object, or
a network address associated with a host device performing the determining whether the current transmission origination location includes a similarity to a previous transmission origination location associated with a previous transmission of the previous request, based on identification information included in the redirection object.

16. The method of claim 14, further comprising:
generating a first redirect request identifier and a first redirect request object that includes a request URL associated with the destination network location requested for redirection; and
initiating storage of the first redirect request object, based on a storage location identifier included in the first redirect request identifier, wherein:
generating, via the device processor, the redirection object includes generating, via the device processor, the redirection object that includes the retransmission location indicator and the identification information associated with identification of the previous transmission origination location, the identification information including the first redirect request identifier.

17. The method of claim 9, wherein:
the redirection object includes one or more of:
a redirection URL,
an indication of a storage location associated with storage of a location indicator that indicates the destination location for the redirection,
a location indicator indicating a target location for transmission of the current request from the current unauthenticated requestor,
a URL associated with the destination network location, or
an encrypted indication of the destination network location.

18. The method of claim 9, wherein:
determining whether the current transmission origination location includes the similarity includes determining whether the current transmission origination location includes the similarity to the previous transmission origination location, based on one or more of:
a set of Global Positioning System (GPS) coordinates associated with a position of a first originating transmitting device, or
an Internet Protocol (IP) address associated with a transmission received from a second originating transmitting device.

19. A computer program product tangibly embodied on a computer-readable storage medium and including executable code that causes at least one data processing apparatus to:
receive, based on a current request, a redirection object, the redirection object associated with a response to a previous request from a previous unauthenticated requestor for a redirection to a destination network location, the redirection object previously generated in response to the previous request and transmitted to the previous unauthenticated requestor in response to the previous request, without authentication of the previous unauthenticated requestor;
determine a current transmission origination location associated with the current request;
determine whether the current transmission origination location includes a similarity to a previous transmission origination location associated with a previous transmission of the previous request, based on identification information included in the redirection object; and determine whether to initiate a redirect operation, based on a result of the determining of the similarity.

20. The computer program product of claim 19, wherein:

the previous transmission origination location includes an origination Internet Protocol (IP) address associated with the previous transmission of the previous request, the current request includes a current request of a current originating unauthenticated requestor, and the previous request includes a request URL associated with the destination network location requested for redirection of a requesting unauthenticated client associated with the previous originating unauthenticated requestor, the requesting unauthenticated client associated with an originating transmission of the previous request from the previous origination location, wherein:

the current originating unauthenticated requestor includes the previous originating unauthenticated requestor.

* * * * *